(12) United States Patent
Gwilt et al.

(10) Patent No.: US 6,904,500 B2
(45) Date of Patent: Jun. 7, 2005

(54) CACHE CONTROLLER (75) Inventors: David John Gwilt, Cambridge (GB); Richard Roy Grisenthwaite, Cambridgeshire (GB)

(73) Assignee: ARM Limited, Cambridge (GB)

( * ) Notice: Subject to any disclaimer, the term of this patent is extended or adjusted under 35 U.S.C. 154(b) by 308 days.

(21) Appl. No.: 10/207,386

(22) Filed: Jul. 30, 2002

(65) Prior Publication Data

US 2004/0024974 A1 Feb. 5, 2004

(51) Int. Cl.[7] .............................................. G06F 12/12
(52) U.S. Cl. ...................... 711/133; 711/145; 711/156; 711/159
(58) Field of Search .................. 711/133–134, 144–145, 711/156, 159, 3

(56) References Cited

U.S. PATENT DOCUMENTS

| | | | | |
|---|---|---|---|---|
| 5,781,916 A | * | 7/1998 | Hardage et al. ............ 711/118 |
| 5,781,926 A | * | 7/1998 | Gaskins et al. ............. 711/145 |
| 5,835,929 A | * | 11/1998 | Gaskins et al. ................ 711/3 |
| 2003/0110356 A1 | * | 6/2003 | Williams, III ............... 711/133 |

* cited by examiner

Primary Examiner—Denise Tran
(74) Attorney, Agent, or Firm—Nixon & Vanderhye P.C.

(57) ABSTRACT

A cache controller operable to control a cache comprising cache lines, each being operable to store data words and validity information indicating that all data words within that cache line are valid. The cache controller comprises a linefill mechanism operable to write data words to a cache line, to provide an indication when each of the data words has been written to the cache and to set the validity information when all data words in the cache line have been written; and a data word accessing mechanism, responsive to a request to access a data word during a linefill operation prior to the validity information being set, to determine from the indication provided by the linefill mechanism whether the data word to be accessed has already been written during the linefill operation and, if so, to provide a signal indicating that the data word is accessible.

16 Claims, 5 Drawing Sheets

CACHE CONTROLLER

BACKGROUND OF THE INVENTION

1. Field of the Invention

This invention relates to the field of data processing systems. More particularly, this invention relates to a cache controller operable to access data words during a linefill operation.

2. Description of the Prior Art

A cache may be arranged to store data and/or instructions so that they are subsequently readily accessible by a processor. Hereafter, the term "data word" will be used to refer to both instructions and data having any predetermined size. The cache will store a data word associated with a memory address until it is overwritten by a data word for a new memory address required by the processor. The data word is stored in cache using either physical or virtual memory addresses.

The processor will access the cache to determine whether a required data word is stored therein. Should the data word not be present in the cache then a so-called "cache-miss" will be issued which causes a read from a main memory. It will be appreciated that such a read from main memory is relatively slow compared to a read from the cache and can reduce the processing speed of the processor. It is known following a cache-miss to retrieve a number of logically adjacent data words from main memory. This is because it is recognised that most data word accesses are sequential and so it is likely that a subsequent access will also result in a cache-miss. By retrieving a number of data words from memory the likelihood of the required data word being present in the cache is increased. Such retrieval of data words is known as a so-called "linefill operation" whereby a complete cache line of, for example, eight data words will be fetched from main memory and stored into a single line of the cache.

It will be appreciated that the writing of data words to the cache is limited by the architecture provided. Typically, a linefill can take a number of clock cycles to complete. It is known to provide a linefill mechanism which receives the cache-miss and controls the retrieval of each data word from the main memory over the data buses to the cache. A known data bus may be arranged to retrieve data words in pairs from the main memory and, hence, may take four cycles to complete an example eight data word linefill.

It is known in such caches for each cache line to be provided with a valid flag which indicates whether the data words stored therein are valid and can be accessed. This valid flag is set once all the data words have been correctly retrieved from main memory and stored in the cache. Hence, the valid flag may not be set for a number of clock cycles, such as for example, four cycles.

It will be appreciated that it would be undesirable following a cache-miss for the processor to wait a number of cycles for the data word which caused the cache-miss to become accessible. Accordingly, it is known to provide a mechanism which routes the particular data word which caused the cache-miss to the processor whilst the linefill is taking place in order to improve performance.

However, as mentioned above, it is likely that a further data word being provided by the linefill will be needed by the processor before the linefill completes and the valid flag has been set indicating that the required data word is accessible.

Hence, a technique exists (as is described in our co-pending U.S. patent application 10/011,310, filed 11 Dec. 2001, now U.S. Pat. No. 6,782,482, the full disclosure of which is incorporated herein by reference) which enables data words being provided by the linefill to be accessed before the valid flag has been set. This technique utilises a so-called "fill buffer" in which the complete cache line is retrieved and stored in the linefill mechanism before providing the data words to the cache. It will be appreciated that the size of the bus between the linefill mechanism and memory could be selected to be any suitable size. Whilst the fill buffer enables each data word to be accessed during the linefill, the amount of logic gates required to implement the fill buffer is considerable. For example, a cache line which stores eight, 32-bit words would typically require at least 2,500 logic gates (assuming an eight word cache line which would require eight 32-bit registers with each register requiring 10 gates). It will be appreciated that it is desirable for cost and power consumption reasons to keep the amount of logic gates required to a minimum.

Accordingly, it is desired to provide a more efficient technique which enables data words being provided by a linefill to be accessed during a linefill.

SUMMARY OF THE INVENTION

Viewed from one aspect, the present invention provides a cache controller operable to control a cache, the cache comprising a plurality of cache lines, each of the plurality of cache lines being operable to store a plurality of data words and to store validity information indicating that all data words within that cache line are valid, the cache controller comprising: a linefill mechanism operable during a linefill operation to write a plurality of data words to a cache line, to provide an indication when each of the plurality of data words has been written to the cache and to set the validity information when all data words in the cache line have been written; and a data word accessing mechanism, responsive to a request to access a data word during a linefill operation prior to the validity information being set, to determine from the indication provided by the linefill mechanism whether the data word to be accessed has already been written during the linefill operation and, if so, to provide a signal indicating that the data word is accessible.

By providing a linefill mechanism which includes an indication of whether or not each data word has been written to the cache, it is possible to readily determine whether, during a linefill, a requested data word has been written to the cache without having to wait for the complete cache line to be written and the validity information set. Any data word which the indication shows as being accessible can then be accessed directly from the cache in a conventional manner. Since the linefill mechanism need only provide an indication that the data word is accessible from the cache and does not need to store the data word itself, the amount of logic required is considerably reduced whilst still enabling the data word to be accessed.

Accordingly, the present invention recognises that to be able to access individual data words an additional indication needs to be provided. However, the present invention appreciates that whilst this indication could be provided in the cache, this would reduce the storage efficiency. Also, the present invention appreciates that for accesses to cache lines that have already been written, the validity information will be set. Hence, the present invention also recognises that the particular delay is specific to accessing data words during a linefill and provides an additional indication of whether the data words which are the subject of the linefill have been written to the cache. Whilst providing this additional indication requires extra logic, this extra logic need not be duplicated for every cache line but instead is provided once in the linefill mechanism. Because the linefill mechanism can now provide an indication of whether a data word to be accessed has already been written during that linefill operation, there is no requirement for the linefill mechanism to be provided with the considerable additional logic required to support a fill buffer. This reduction in the amount of logic provides performance, cost and power consumption benefits.

In preferred embodiments, the request to access a data word includes information identifying which of the plurality of data words is to be accessed and the data word accessing mechanism is operable to compare this information with the indication to determine whether the data word has been written.

Hence, through a simple comparison, the data word accessing mechanism is able to establish whether the requested data word has been written to the cache and, if the comparison reveals that it has, to provide a signal indicating that the data word is accessible. It will be appreciated that the information identifying which of the plurality of data words is to be accessed may be in any suitable form such as, for example, an address or portion of an address of the data word.

In preferred embodiments, the indication comprises a flag associated with each of the plurality of data words being written to a cache line, each associated flag being set when the data word has been written.

The provision of flags provides a simple and convenient mechanism which enables the data word accessing mechanism to readily determine whether the requested data word has been written to the cache. Also, it will be appreciated that the provision of one flag for each data word requires significantly less logic than providing storage for the data word itself.

In a preferred embodiment, during the linefill operation each of the plurality of data words is written sequentially to the cache line, a flag being set after each of the plurality of data words is validly written.

It will be appreciated that such sequential writing of data words could include so-called wrapping of data words which is well known in the art. Wrapping of data words occurs when the first data word selected for the linefill is a data word other than the data word associated with the first logical entry of that cache line. In this situation, even though the logical end of a cache line may be reached, it will be appreciated that not all the data words of the cache line will have been written and accordingly, the sequence of data words will wrap around to the other logical end of the cache line to continue the writing sequence. For example, assume a four word cache line arranged to store data words DW0, DW1, DW2, DW3 at entries AD0, AD1, AD2, AD3 respectively. If the first data word to be written is for example DW2 then the sequence of data words to be written could be DW3, DW0, DW1 or DW1, DW0, DW3 each stored at their respective entry.

In a preferred embodiment, the data words comprise a double word and a flag is associated with each double word.

It will be appreciated that the use of double words can considerably speed up a linefill. Given that one flag is provided for each double word, the flag is set when both words have been written to the cache. Hence, if either word of a double word is requested then the data word accessing mechanism will be operable to provide an indication that a requested data word is accessible if the flag associated with the double word has been set.

In preferred embodiments, each cache line has validity information associated therewith, the validity information being set when all data words in the cache line have been written.

Hence, given that it will typically take a number of cycles for all of the data words to be written into the cache line, the validity information is not set for that number of cycles.

In preferred embodiments, the request to access a data word includes word information identifying which of the plurality of data words is to be accessed and the data word accessing mechanism is operable during a linefill including that data word to compare the word information with the flags to determine whether the data word has been written.

For example, if the information identifies that the $P^{th}$ word of the cache line is to be accessed then the data word accessing mechanism determines the status of the flag associated with the $P^{th}$ word of the linefill to establish whether that data word has been written.

In preferred embodiments, the cache is operable to store each data word at an associated address and the linefill mechanism provides an address indication indicating the addresses of data words being written during the linefill operation, the request to access a data word including word address information identifying which of the plurality of data words is to be accessed and the data word accessing mechanism is operable to compare the word address information with the address indication to determine whether the data word has been written.

By comparing the address of the requested data word with the addresses of the data words being written during a linefill, it is possible to determine whether the requested data word is one of the data words undergoing the linefill operation and, by examining the flag associated with that word, whether that word is accessible.

Preferably, the cache comprises an 'N'-way set associative cache operable to store the plurality of data words in any one of the 'N'-ways and 'N' of the linefill mechanism are provided, each linefill mechanism being associated with one of the ways and having a way enable indication which provides an indication when that way is selected to store the plurality of data words, the data word accessing mechanism being operable, responsive to the request to access a data word, to identify from the way enable indication the way in which the data word is being stored and the indication that the data word is accessible includes information identifying that way.

Hence, in embodiments which utilise cache ways, by examining the way enable indication, it is possible to determine whether a linefill is occurring in that way and then by examining the flag associated with the requested data word, whether that word is accessible. By providing information identifying the way in which the requested data word is being stored, the requested data word may be accessed in a conventional manner.

Viewed from another aspect, the invention provides in a cache controller operable to control a cache, the cache comprising a plurality of cache lines, each of the plurality of cache lines being operable to store a plurality of data words and to store validity information indicating that all data words within that cache line are valid, a method of operating the cache controller comprising the steps of: providing, during a linefill operation to write a plurality of data words to a cache line, an indication when each of the plurality of data words has been written to the cache; setting the validity information when all data words in the cache line have been written; and determining from the indication and responsive to a request to access a data word during a linefill operation prior to the validity information being set, whether the data word to be accessed has already been written during the linefill operation and, if so, providing a signal indicating that the data word is accessible.

BRIEF DESCRIPTION OF THE DRAWINGS

Embodiments of the invention will now be described, by way of example only, with reference to the accompanying drawings in which.

DESCRIPTION OF THE PREFERRED EMBODIMENTS

Figure 1:
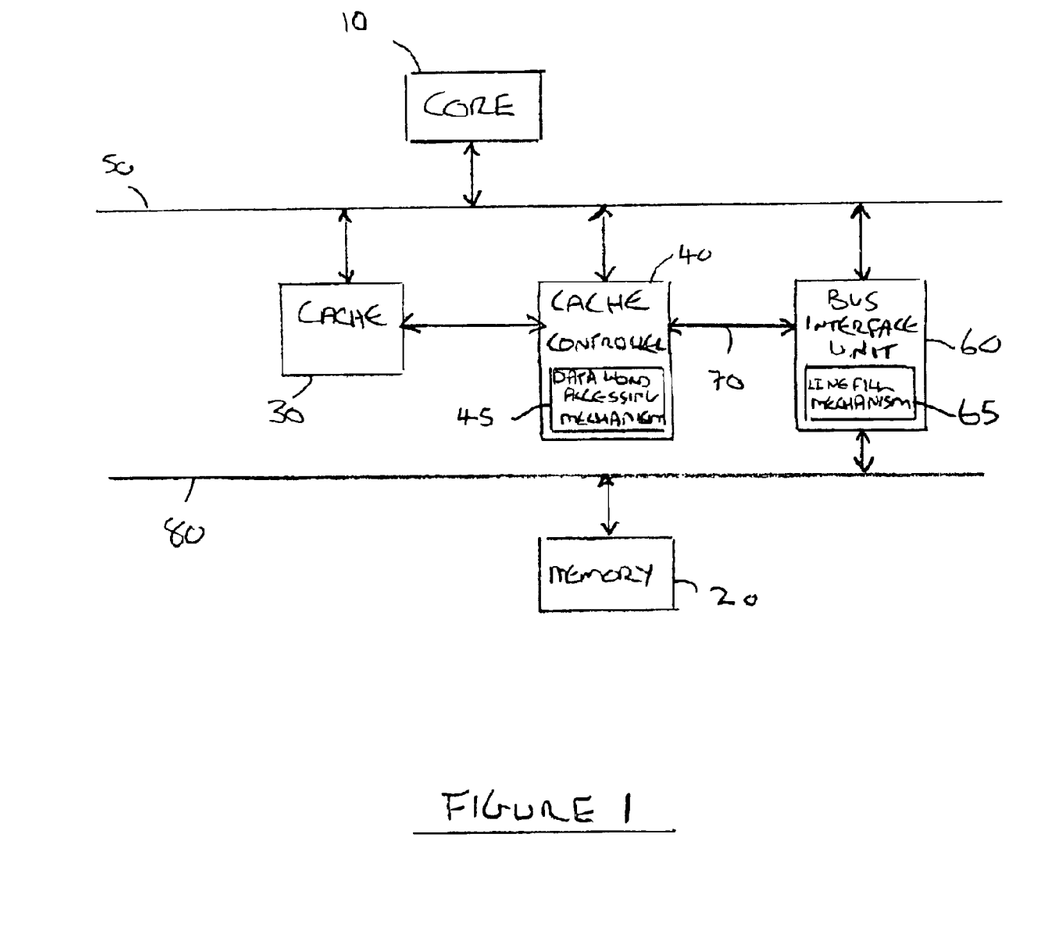
FIG. 1 schematically illustrates an example architecture of a data processing apparatus in which embodiments of the present invention may be employed.

A data processing apparatus will be described with reference to the block diagram of FIG. 1. As shown in FIG. 1, the data processing apparatus has a processor core 10 arranged to perform processing operations under the control of instructions received from memory 20. Data words required by the processor core 10 while executing those instructions may also be retrieved from memory 20. A cache 30 is provided for storing data words (which may be data and/or instructions) retrieved from the memory 20 so that they are subsequently readily accessible by the processor core 10. A cache controller 40 controls the storage of data words in the cache 30 and controls the retrieval of the data words from the cache 30. The cache controller 40 also includes a data word accessing mechanism 45 for accessing data words being written during a linefill as will be described in more detail below. Whilst it will be appreciated that a data word may be of any appropriate size, for the purposes of the following description it will be assumed that each data word is a double word (64 bits) in size.

When the processor core 10 requires to read a data word, it initiates a request by placing an address for the data word on a processor address bus, and a control signal on a control bus. The control signal includes information such as whether the request specifies instruction or data, read or write, word, half word or byte. The address is received by the cache 30 and compared with the addresses in the cache 30 to determine whether the required data word is stored in the cache 30. If the data word is stored in the cache 30, then the cache 30 outputs the data word onto the processor data bus 50. If the data word corresponding to the address is not within the cache 30, then a bus interface unit (BIU) 60 is used to retrieve the data word from memory 20.

The BIU 60 will examine the processor control signal to determine whether the request issued by the processor core 10 is a read or write instruction. For a read request, should there be a cache miss (indicated by signal on path 70—e.g. signal "low" indicates a cache miss, signal "high" indicates cache hit), the BIU 60 will initiate a read from memory 20.

When retrieving data words for storage in the cache 30, a so-called "linefill" technique is used whereby a complete cache line of data words will be fetched and stored. In this example, a cache line comprises four double words. A linefill mechanism 65 is provided in the BIU 60 which manages the retrieval and storage of the data words from the memory 20. Depending on the write strategy adopted for the cache 30 (such as write-back), a complete cache line may also need to be evicted prior to the linefill being performed. Hence, the linefill mechanism 65 ensures the data words to be evicted are firstly read from the cache 30. Then, for each data word to be retrieved, the linefill mechanism 65 passes the address of the data word onto an external address bus. A control signal is then placed on an external control bus. The memory 20 will determine from the control signal that a memory read is required and will then output on the external data bus 80 the data word at the address indicated on the external address bus. The BIU 60 will then pass the data word from external data bus 80 to the processor data bus 50, where it can be stored in the cache 30. This process is repeated until the complete cache line has been written, at which stage, in the cache 30, a valid bit associated with that cache line is set and that the cache line can be accessed directly from the cache 30 by the processor core 10. Since a linefill requires the memory 20 to be accessed via the external bus 80, this operation is relatively slow as it is governed by the memory speed and the external bus speed. Also, it will be appreciated that the linefill operation may take a number of clock cycles and may have a significant impact on the performance of the processor.

Figure 2:
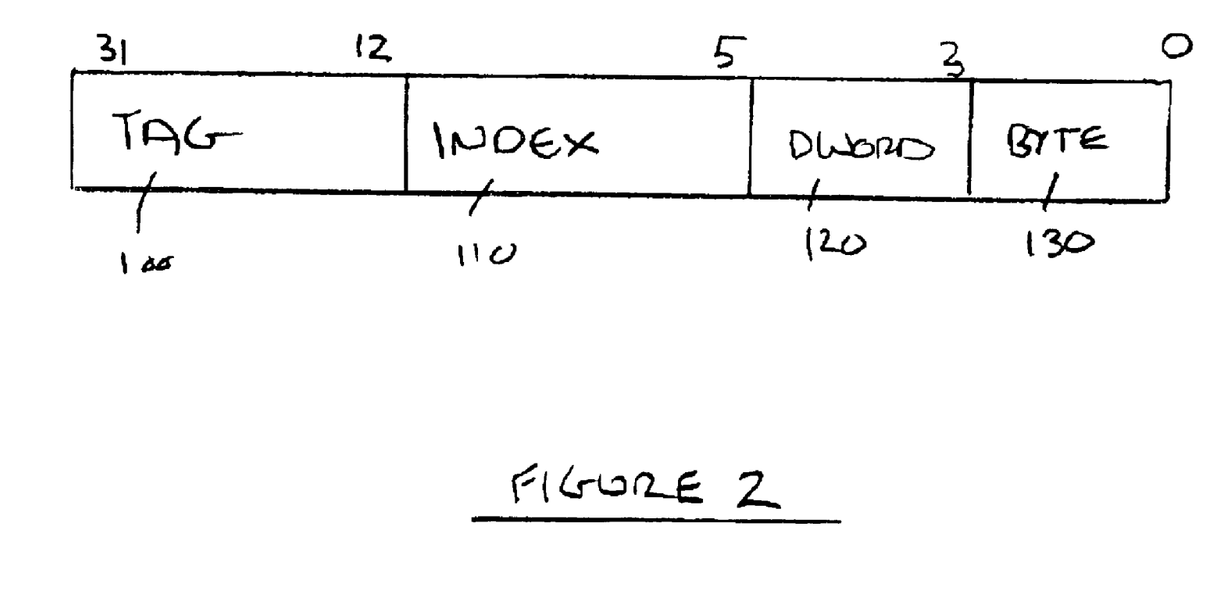
FIG. 2 schematically illustrates an example address structure of data words.

FIG. 2 illustrates the contents of the address associated with each data word. The 32-bit address may be considered to consists of a TAG portion 100, and INDEX, DWORD and BYTE portions 110, 120, 130, respectively. Bits from the TAG portion 100 (bits 31 to 12 of the address) are used in associative caches to determine in which way the data word is stored. The INDEX portion 110 (bits 11 to 5 of the address) is used to identify a particular entry within the cache 30. The DWORD portion 120 (bits 4 and 3 of the address) identifies a particular double word within the cache line, whilst the BYTE portion 130 (bits 2 to 0 of the address) allows a particular byte within the double word to be specified, if required.

Figure 3:
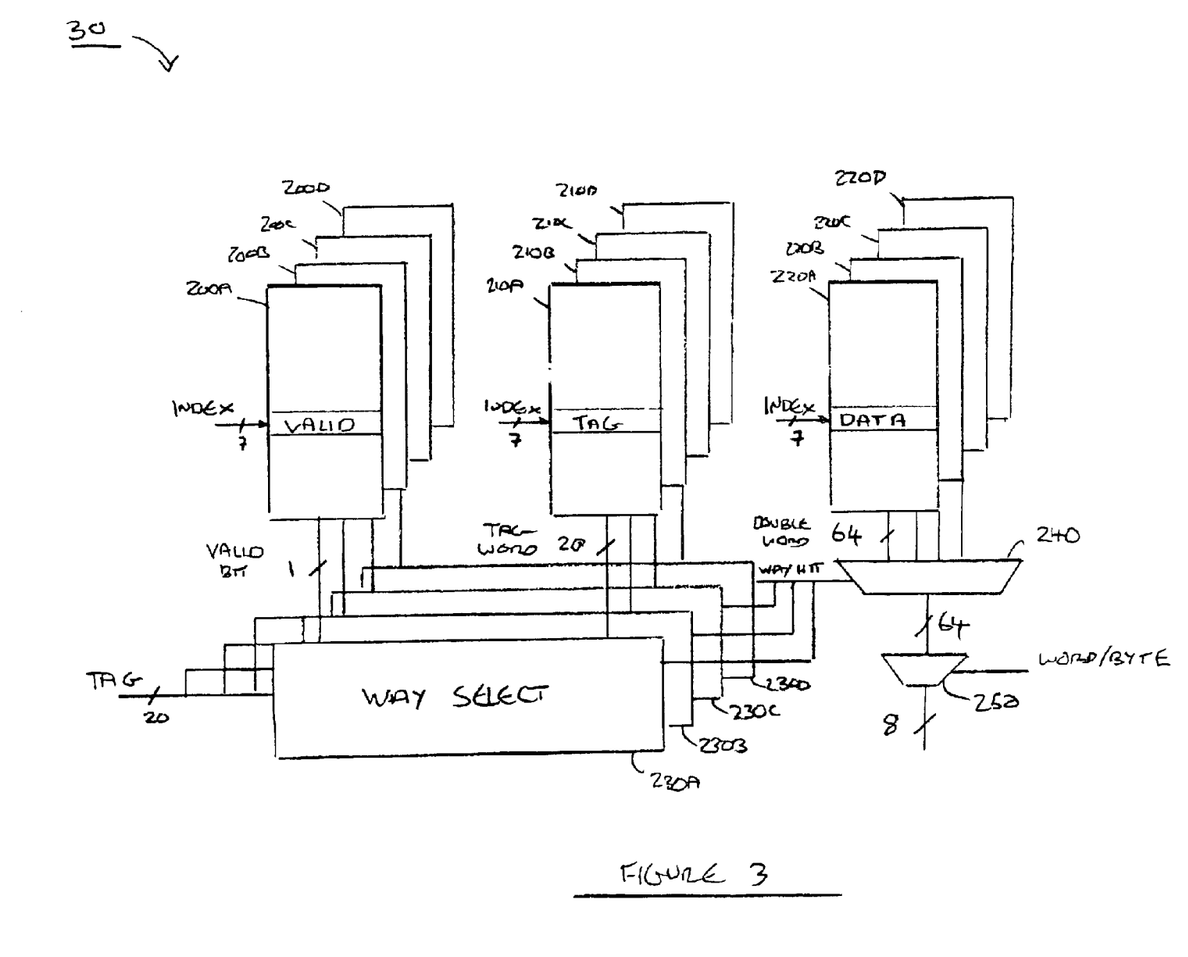
FIG. 3 schematically illustrates an arrangement of the cache of FIG. 1.

FIG. 3 illustrates in more detail the operation within the cache 30 when the processor core 10 requests a data word. The cache 30 comprises of four ways, a way selector 230A-D associated with each way, and multiplexers 234, 250.

Each way contains a VALID memory 200A; 200B; 200C; 200D, a TAG memory 210A; 210B; 210C; 210D and a data memory 220A; 220B; 220C; 220D. The data memory of each way contains a plurality of cache lines that are arranged to store the data words. Each INDEX points to just one cache line in each way. Associated with each cache line is an entry in the TAG memory in which a TAG is stored, and an entry in the VALID memory in which a valid bit is stored.

When a read is requested, the address for the data word is placed on the processor address bus. The address is received by the cache 30 from the processor address bus. The VALID memory, TAG memory and data memory in each way receive the INDEX portion of the address. Each VALID memory outputs the VALID bit stored at the location specified by INDEX portion of the address to the associated way selector. Each TAG memory outputs the TAG word stored at the location specified by INDEX portion of the address to the associated way selector. The data memory outputs the data word stored at the location specified by the INDEX portion to the multiplexer 240.

Figure 4:
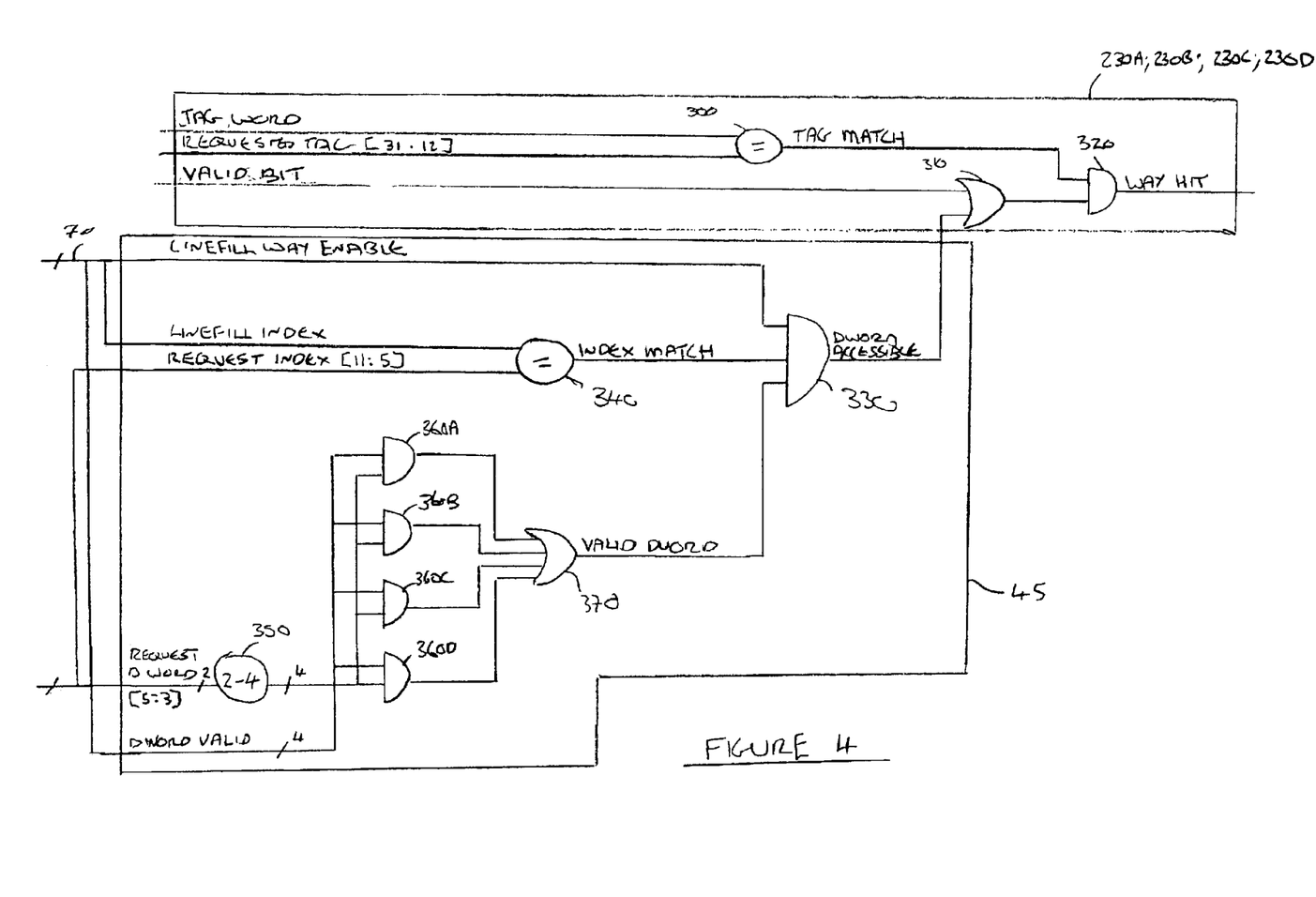
FIG. 4 schematically illustrates an arrangement of part of the cache controller according to an embodiment of the present invention.

As illustrated in FIG. 4, each way selector receives the VALID bit output by the associated VALID memory, the TAG word output by the associated TAG memory and the TAG portion of the address. A comparator 300 compares the TAG portion of the address with the TAG word. The status of the VALID bit (the VALID bit ORed with another signal, as will be described later) and the output of the comparator 300 are provided to the AND gate 320. If the TAG portion and the TAG word match and the VALID bit is set then the AND gate outputs a "way hit" signal to the multiplexer 240.

Should one of the way selectors output a way hit signal to the multiplexer 240 then the multiplexer 240 selects the double word associated with that way and outputs the double word to the multiplexer 250. The multiplexer 250 then selects the required word or byte in response to the WORD/BYTE portions of the address. The cache 30 then indicates a cache hit and outputs the required data word onto the processor data bus 50. Hence, the processor core 10 is provided with the data word directly from the cache 30.

However, should none of the way selectors output a way hit signal then the cache 30 is operable to output a cache-miss signal to the BIU 60 to initiate a linefill. The required data word will be read as part of the linefill from memory 80 and stored in the cache 30. The linefill mechanism 65 will determine based on a predetermined eviction policy (victim selection) which way to store the retrieved cache line. Hence, the processor core 10 is provided with the data word following a delay while it is read from memory 80 and stored in the cache 30 as part of the linefill. As will be explained in more detail below, with reference to FIG. 5, the TAG word associated with that cache line is written to the selected TAG memory which overwrites a TAG word previously stored in that TAG memory. Thereafter the required data word and subsequent data words of the cache line are written to the selected data memory which overwrites the data words previously stored in that data memory. Once the cache line has been written, the VALID bit in the VALID memory associated with that cache line is set.

The remainder of FIG. 4 illustrates word access circuitry which is part of the cache controller. The word access circuitry enables a cache hit to be provided even when the associated VALID bit has not been set. The word access circuitry illustrated in FIG. 4 is duplicated for each way. As explained above, the need to provide a cache hit in these circumstances can occur when the required data word is currently part of a cache line undergoing a linefill operation.

The word access circuitry receives a linefill way enable signal from the linefill mechanism 65 over the path 70 which is set to a logical '1' when that way has been selected for the linefill. If no linefill is being performed in that way then the linefill way enable signal will be set to a logical '0'. The linefill way enable signal is provided to an input of an AND gate 330.

The word access circuitry receives the INDEX associated with a word requested by the processor over the processor address bus and an INDEX associated with the linefill currently being performed from the linefill mechanism 65 over the path 70. The linefill INDEX and the request INDEX are compared by a comparator 340 which outputs an index match signal to the AND gate 330. If the linefill INDEX and the request INDEX match, then the index match signal is set to a logical '1', otherwise the index match signal is set to a logical '0'.

The word access circuitry also receives the DWORD portion of the address associated with the word requested by the processor over the processor address bus. This 2-bit value is decoded by a two to four decoder 350 which decodes as illustrated in Table 1 below.

TABLE 1

| REQUEST DWORD | DECODED REQUEST DWORD |
| --- | --- |
| 00 | 0001 |
| 01 | 0010 |
| 10 | 0100 |
| 11 | 1000 |

Each bit of the decoded request DWORD is provided to an input of a respective AND gate 360A; 360B; 360C; 360D. AND gates 360A; 360B; 360C; 360D also receive at the other input the status of a number of flags in the linefill mechanism 65 over the path 70. In this example, four flags are provided, one for each DWORD of a linefill. At the beginning of a linefill, the flags are set to a logical '0'. As each DWORD is validly written to the cache, the flag associated with that DWORD is set. Accordingly, each flag provides an indication of whether the associated DWORD is accessible by the processor. The output of each AND gate 360A; 360B; 360C; 360D is provided to an OR gate 370 which outputs a valid DWORD signal to the AND gate 330. Hence, if the flag associated with the requested DWORD is set, then the valid DWORD signal is set to a logical '1', otherwise the valid DWORD signal is set to a logical '0'.

When the AND gate 330 receives a logical '1' at each of its inputs indicating that a linefill is being performed in the associated way, that the requested INDEX matches the linefill INDEX, and that the requested DWORD has been written to the cache, then the AND gate 330 outputs a DWORD accessible signal having a logical value of '1' to the OR gate 310 of the associated way selector 230A; 230B; 230C; 230D. Accordingly, a way hit signal is also provided when it is established that the requested DWORD is undergoing a linefill operation, and the associated flag has been set indicating that it is accessible. Hence, it will be appreciated that because each flag is set when each associated DWORD has been written then, this allows the DWORD to be accessed before the complete linefill has taken place and the VALID bit associated with that line has been set, as will be illustrated with reference to FIG. 5 below. Also, it will be appreciated that because neither the cache controller 40 nor the linefill mechanism 65 of the BIU 60 need to store the cache line, then the amount of logic required to enable the earlier access of a DWORD is significantly reduced which provides performance, cost and power benefits.

Figure 5:
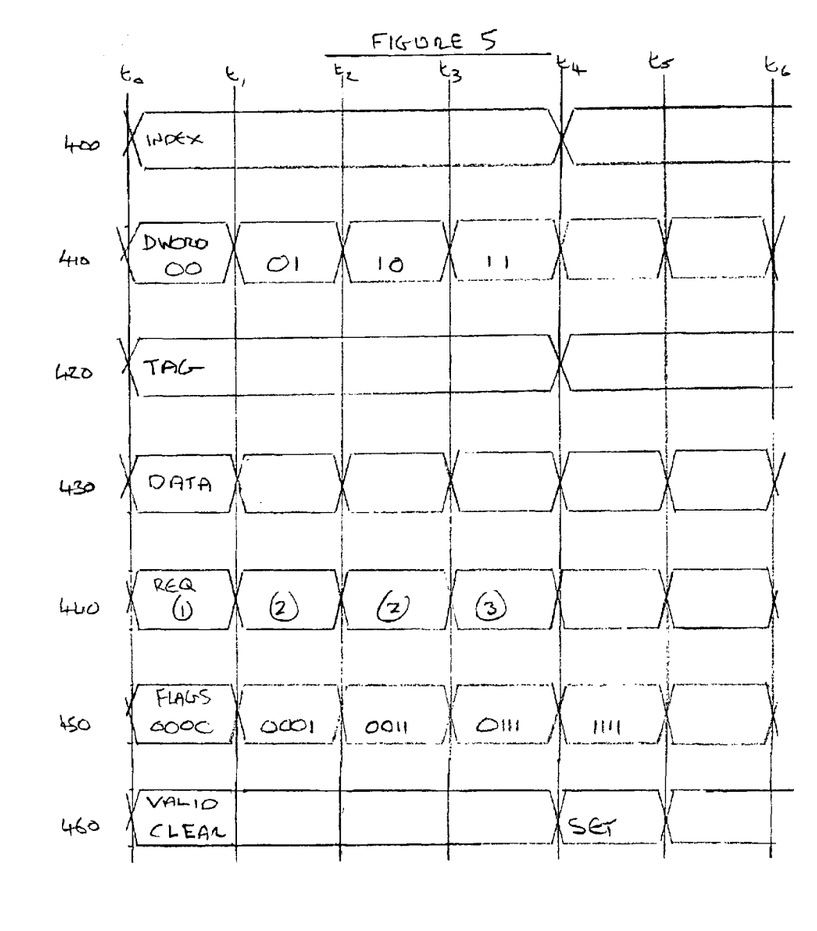
FIG. 5 is an example timing diagram used to illustrate the operation of the part of the cache controller of FIG. 4.

FIG. 5 shows the timing of signals according to an embodiment of the present invention. The diagram starts at $t_0$ and progresses to $t_6$, with each interval being equal to one clock cycle. Hence, the diagram shows six clock cycles.

At $t_0$, in response to a request signal (REQ 1) issued by the cache controller 40 to the linefill mechanism 65 (illustrated by trace 440), the INDEX and TAG portions of the address associated with the linefill operation are placed on the processor address bus and remain there for the duration of the linefill (in this example, four cycles) as illustrated in traces 400 and 420 respectively.

Also at $t_0$, the VALID bit associated with the cache line which is the subject of the linefill operation is cleared, as are the flags associated with each DWORD as illustrated in traces 460 and 450 respectively. Additionally, the TAG portion of the address is written to TAG memory associated with the selected way at the entry associated with the cache line which corresponds to the INDEX portion provided on the processor address bus.

Furthermore, at $t_0$, in response to a request signal (REQ 1), the DWORD portion of the address is set to indicate DWORD '00' on the address bus, the data associated with that address is provided on the data bus which is then stored at the corresponding location of data memory associated with the selected way. In the next cycle, at $t_1$, in response to a request signal (REQ 2) issued by the cache controller 40 to the linefill mechanism 65 (illustrated by trace 440), the DWORD portion of the address is set to indicate DWORD '01' on the address bus, the data associated with that address is provided on the data bus which is then stored at the corresponding location of data memory associated with the selected way. In the next cycle, at $t_2$, in response to the request signal (REQ 2) issued by the cache controller 40 to the linefill mechanism 65 (illustrated by trace 440), the DWORD portion of the address is set to indicate DWORD '10' on the address bus, the data associated with that address is provided on the data bus which is then stored in the corresponding location of data memory associated with the selected way. In the next cycle, at $t_3$, in response to a request signal (REQ 3) issued by the cache controller 40 to the linefill mechanism 65 (illustrated by trace 440) the DWORD portion of the address is set to indicate DWORD '11' on the address bus and the data associated with that address is provided on the data bus as indicated by traces 410 and 430 respectively and the VALID bit associated with the cache line is set in the next clock cycle, $t_4$, to indicate that the cache line is accessible.

However, after each DWORD is written to the cache, the linefill mechanism 65 sets the associated flag to indicate that the DWORD is accessible as illustrated by trace 450 which shows that the flag associated with DWORD '00' is set at $t_1$, the flag associated with DWORD '01' is set at $t_2$, the flag associated with DWORD '10' is set at $t_3$, and the flag associated with DWORD '11' is set at $t_4$.

Hence, it is clear from FIG. 5 that in prior art systems which utilise only the valid bit to determine whether a data word is accessible, then none of the data words will be identified as accessible until $t_4$. However, by utilising the flags, the data words are indicated as accessible as soon as it is confirmed that they have been validly written which provides significant performance improvements.

It will be appreciated that whilst it is shown that each DWORD is written in one clock cycle, embodiments of the present invention may be applied to systems in which such writing takes other than one clock cycle.

Also, it will be appreciated that whilst FIG. 5 illustrates writing the cache line starting with DWORD '00', this word need not be written first and instead if the cache miss is associated with a word from a different DWORD, then the linefill mechanism 65 may be arranged to retrieve that DWORD first and then perform the linefill with the remaining DWORDS which may involve performing writing in a wrapping sequence as described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A cache controller operable to control a cache, said cache comprising a plurality of cache lines, each of said plurality of cache lines being operable to store a plurality of data words and to store validity information indicating that all data words within that cache line are valid, said cache controller comprising:

a linefill mechanism operable during a linefill operation to write a plurality of data words to a cache line, to provide an indication when each of said plurality of data words has been written to said cache and to set said validity information when all data words in said cache line have been written; and a data word accessing mechanism, responsive to a request to access a data word during a linefill operation prior to said validity information being set, to determine from said indication provided by said linefill mechanism whether said data word to be accessed has already been written during said linefill operation and, if so, to provide a signal indicating that said data word is accessible, wherein said request to access a data word includes word information identifying which of said plurality of data words is to be accessed and said data word accessing mechanism is operable to compare said word information with said indication to determine whether said data word has been written.

2. The cache controller as claimed in claim 1, wherein said indication comprises a flag associated with each of said plurality of data words being written to a cache line, each associated flag being set when said data word has been written.

3. The cache controller as claimed in claim 2, wherein during said linefill operation each of said plurality of data words is written sequentially to said cache line, a flag being set after each of said plurality of data words is validly written.

4. The cache controller as claimed in claim 2, wherein said data words comprise a double word and a flag is associated with each double word.

5. The cache controller as claimed in claim 1, wherein each cache line has validity information associated therewith, said validity information being set when all data words in said cache line have been written.

6. The cache controller as claimed in claim 2, wherein said request to access a data word includes word information identifying which of said plurality of data words is to be accessed and said data word accessing mechanism is operable to compare said word information with said flags to determine whether said data word has been written.

7. The cache controller as claimed in claim 6, wherein said cache is operable to store each data word at an associated address and said linefill mechanism provides an address indication indicating the addresses of data words being written during said linefill operation, said request to access a data word including word address information identifying which of said plurality of data words is to be accessed and said data word accessing mechanism is operable to compare said word address information with said address indication to determine whether said data word has been written.

8. The cache controller as claimed in claim 6, wherein said cache comprises an 'N'-way set associative cache operable to store said plurality of data words in any one of said 'N'-ways and 'N' of said linefill mechanism are provided, each linefill mechanism being associated with one of said ways and having a way enable indication which provides an indication when that way is selected to store said plurality of data words, said data word accessing mechanism being operable, responsive to said request to access a data word, to identify from said way enable indication the way in which the data word is being stored and said indication that said data word is accessible includes information identifying that way.

9. In a cache controller operable to control a cache, said cache comprising a plurality of cache lines, each of said plurality of cache lines being operable to store a plurality of data words and to store validity information indicating that all data words within that cache line are valid, a method of operating said cache controller comprising the steps of:

a) providing, during a linefill operation to write a plurality of data words to a cache line, an indication when each of said plurality of data words has been written to said cache;
   b) setting said validity information when all data words in said cache line have been written; and
   c) determining from said indication and responsive to a request to access a data word during a linefill operation prior to said validity information being set, whether said data word to be accessed has already been written during said linefill operation and, if so, providing a signal indicating that said data word is accessible;
   wherein said request to access a data word includes word information identifying which of said plurality of data words is to be accessed and said step c) comprises comparing said word information with said indication to determine whether said data word has been written.

10. The method as claimed in claim 9, wherein said indication comprises a flag associated with each of said plurality of data words being written to a cache line, and said step a) comprises setting each flag being when said associated data word has been written.

11. The method as claimed in claim 10, wherein during said linefill operation each of said plurality of data words is written sequentially to said cache line, and said step a) comprises setting a flag after each of said plurality of data words is validly written.

12. The method as claimed in claim 10, wherein said data words comprise a double word and a flag is associated with each double word.

13. The method as claimed in claim 9, wherein each cache line has validity information associated therewith.

14. The method as claimed in claim 10, wherein said request to access a data word includes word information identifying which of said plurality of data words is to be accessed and said step c) comprises comparing said word information with said flags to determine whether said data word has been written.

15. The method as claimed in claim 14, wherein said cache is operable to store each data word at an associated address, said step a) comprises providing an address indication indicating the addresses of data words being written during said linefill operation, said request to access a data word including word address information identifying which of said plurality of data words is to be accessed and said step c) comprises comparing said word address information with said address indication to determine whether said data word has been written.

16. The method as claimed in claim 14, wherein said cache comprises an 'N'-way set associative cache operable to store said plurality of data words in any one of said 'N'-ways and said step a) comprises providing an indication of the way selected to store said plurality of data words and said step c) comprises identifying from said indication of the way whether said data word has been written to that way.

* * * * *